Figure 1:
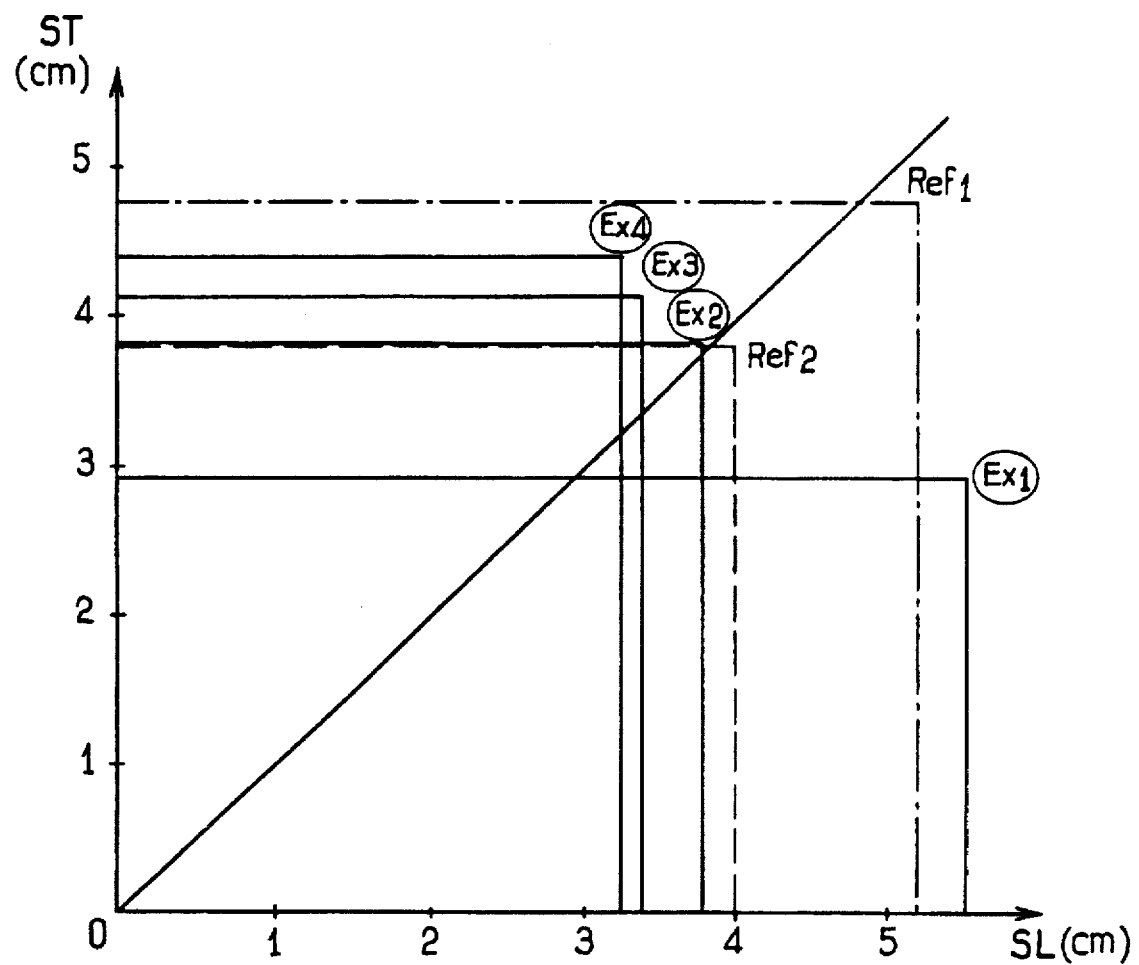

United States Patent [19]

Glez et al.

[11] Patent Number: 5,709,932
[45] Date of Patent: Jan. 20, 1998

[54] ULTRA THIN HEAT-SHRINKABLE MONOLAYER POLYETHYLENE FILMS

[75] Inventors: Jean-François Glez; Jean-Marc Metaix; Philippe Deleplanque, all of Quimper, France

[73] Assignee: Bollore Technologies, Quimper, France

[21] Appl. No.: 561,004

[22] Filed: Nov. 21, 1995

[30] Foreign Application Priority Data

Nov. 21, 1994 [FR] France ................................ 94 13894

[51] Int. Cl.$^6$ .......................... B65B 53/02; C08L 23/08
[52] U.S. Cl. ...................... 428/220; 428/910; 525/240
[58] Field of Search ............................ 428/515, 516, 428/216, 213, 220, 35.1, 34.9, 910; 525/240; 264/290.2

[56] References Cited

U.S. PATENT DOCUMENTS

| | | | |
|---|---|---|---|
| 4,277,594 | 7/1981 | Matthews et al. | 526/352 |
| 4,643,943 | 2/1987 | Schoenberg | 428/339 |
| 5,059,481 | 10/1991 | Lustig et al. | 428/39.9 |

FOREIGN PATENT DOCUMENTS

| | | |
|---|---|---|
| 0 319 4011 | 6/1989 | European Pat. Off. . |
| 0 315 238 | 10/1989 | European Pat. Off. . |
| 0 405 916 | 1/1991 | European Pat. Off. . |
| 0 410 792 | 1/1991 | European Pat. Off. . |

*Primary Examiner*—Paul J. Thibodeau
*Assistant Examiner*—D. Lawrence Tarazano
*Attorney, Agent, or Firm*—Jacobson, Price, Holman & Stern, PLLC

[57] ABSTRACT

This invention relates to a preparation process of a biaxially oriented heat-shrinkable ultra-thin film, biaxially oriented by the flat process and made of linear low-density polyethylene, characterized in that:

an ethylene homopolymer or an ethylene and $C_4$ to $C_{18}$ alpha-olefinic comonomer copolymer of a density lying between 0.89 and 0.94, alone or in combination, are heated beyond the melt temperature and extruded, the extruded film is poured and cooled at the appropriate hardening temperature, the film is drawn a first time in the machine direction at the appropriate temperature between 3 and 7 times the initial dimension of the non stretched film, the film is drawn a second time in the transverse direction at the appropriate temperature between 3 and 15 times the initial dimension of the non stretched film, the biaxially oriented film is drawn a third time in the machine direction at the appropriate temperature between 1.01 and 3 times the dimension after the first draw, the biaxially oriented film obtained is cooled at room temperature.

The invention also concerns an ultra-thin monolayer film obtained notably by such process. These ultra-thin films have a thickness from 6 to 11 µm.

7 Claims, 2 Drawing Sheets

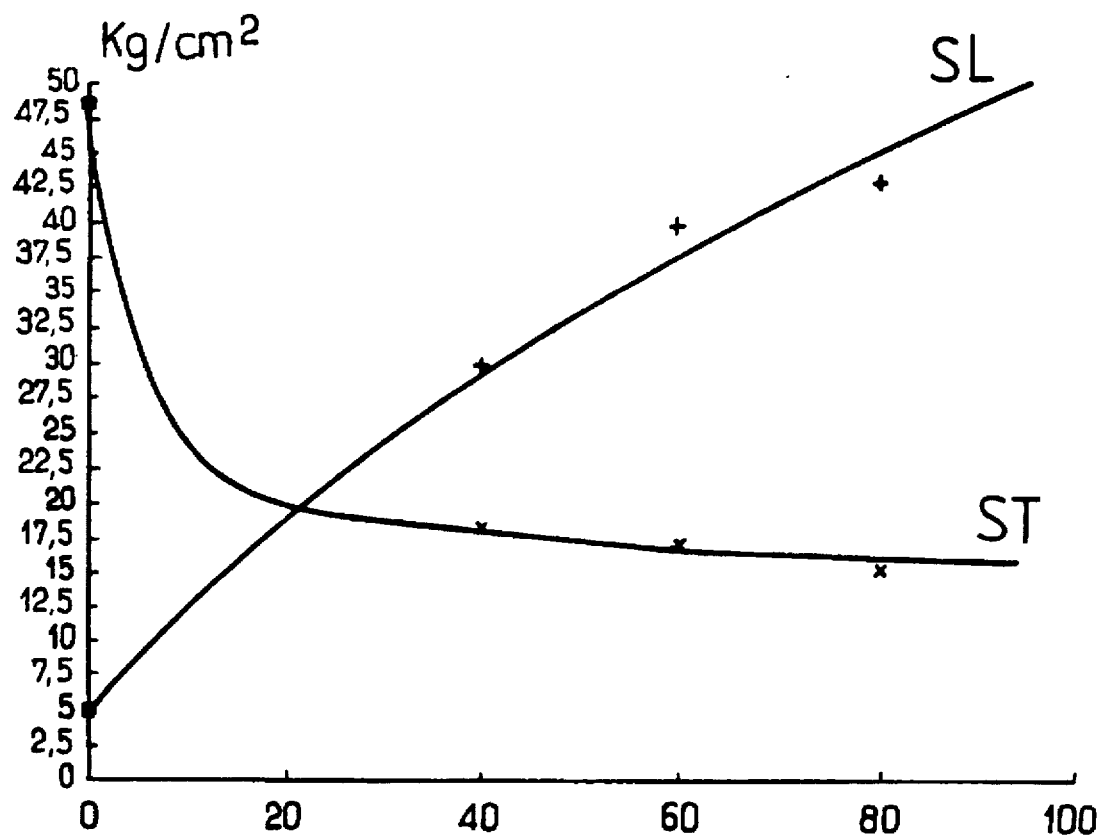
FIG_2

ULTRA THIN HEAT-SHRINKABLE MONOLAYER POLYETHYLENE FILMS

This invention relates to a new preparation process of a biaxially oriented heat-shrinkable ultra-thin monolayer film made of linear low-density polyethylene, a heat-shrinkable ultra-thin film obtained in particular by said process, and a heat-shrinkable multi-layer film comprising such ultra-thin film as core layer.

Polyolefin-based heat-shrinkable films are widely used for wrapping numerous consumer products which may be rigid articles like books, compact discs and video tapes, foodstuffs such as citrus fruit, boxes of chocolate or candies, or non-rigid objects like envelopes.

The expression "heat-shrinkable" is understood to denote the ability of the films to undergo shrinkage of various degrees of intensity in one or several directions under the action of heat generally between 90° and 120° C.

Heat shrinkability is the result of film being submitted to one or several stretches so as to "orient" the film's constitutive polymer chains according to the direction of the strech or streches.

The mains characteristics of these heat-shrinkable films are assessed by measuring:

shrink as a function of temperature, resistance to breaking, shrink force, resistance to tear propagation (once tearing has occurred), heat seal capacity, optical characteristics, particularly brilliance and transparence, and static and dynamic friction coefficients.

These films must of course satisfy increasingly stringent environmental regulations in developed countries.

It is known that concern for the environment lies at the heart of current reservations with respect to polyvinyl chloride (PVC) products on account of the noxious gases emitted when they are fabricated, used and incinerated.

Depending on the use to which they are put, these heat-shrinkable films must present shrink characteristics (shrink percentage, shrink force) which may vary considerably.

In numerous cases, there must be a balanced shrink (as for example in circular or square shapes in order to avoid formation of poorly shrunk zones).

In other applications, it is desirable that:

the global shrink be "unbalanced", that is shrink in one direction be quite different from that in the other direction, the shrink forces be unbalanced, that is shrink force in one direction be quite different from that in the other direction.

In order to reduce the weight of packagings, for economic and thus environmental reasons, it is desirable to provide very thin films, with a thickness of less than 11 µm, designated as ultra thin.

A few years ago, BOLLORE TECHNOLOGIES presented a wrapping film with a polypropylene base (ethylene polypropylene copolymer with low ethylene content) with a thickness of 11 µm.

However, these polypropylene films, while presenting good heat shrinkability, do not in most cases possess a sufficiently high resistance to tear and are therefore fragile.

As a result linear low-density polyethylene films are preferred.

These linear low-density polyethylene films are well known in the art and have been described in particular in the review Plastic Words, February 1981, pages 45–50. They are fabricated from, among other things, polyethylene sold under the Dowlex®2035 or 2045 trademark.

These films are submitted to a biaxial orientation in order to acquire heat shrinkability properties. The biaxial orientation of these films is carried out according to the industrial process by inflating the films extruded in tubular form with air so as to form a bubble. This technique produces a film which is simultaneously oriented in the transverse and longitudinal directions.

A film made according to this process is disclosed in U.S. Pat. No. 4,354,997.

Another film made according to this process is disclosed in French Patent 2 504 537 relating to an ethylene copolymer-based shrinkable film with a $C_8$–$C_{18}$ alpha-olefin having a density between 0.9 and 0.94 and two distinct crystalline melt points below 128° C.

The envisaged fabrication method is that of the "double bubble" type known per se, which consists of extruding the material through a die by giving it a tubular form, first cooling it and then re-heating it to an appropriate temperature by stretching it longitudinally and at the same time increasing the transverse dimensions of the cladding by the presence of a volume of captive air.

European Patent 240 705 also discloses such films obtained by a similar process in which a non-stretched tubular film is expanded and elongated by means of air pressure in the tube.

A multi-layer ultra-thin film, based on a linear polyethylene core layer of very low-density and two EVA surface layers, has nonetheless been described in U.S. Pat. No. 5,298,202. In the applicant's opinion, it is not possible to fabricate such a film in industrial conditions with a monolayer of linear (very) low-density polyethylene.

Generally speaking, this process provides balanced films but cannot give thin monolayer films (less than 15 µm thick). Moreover, given that polymer melt point is very close to orientation temperature, this process results in irregular thickness and consequently irregular characteristics. In other words, it is difficult to master this process.

There is another biaxial orientation process, known as "flat" biaxial orientation. A film is extruded through a flat die, cooled at a hardening, temperature and then streched in the course of two successive steps in two perpendicular directions.

European Patent 319 401 discloses a particularly interesting fabrication process by flat biaxial orientation for a heat-shrinkable thermoplastic film based on a low density ethylene copolymer.

This flat stretching process has numerous advantages, in particular improved temperature control and greater thinness. The examples given in this patent mention a thickness which is appreciably higher at the edges than at the middle.

A similar process is described in European Patent 405 916. In the examples given in this patent, the films present a thickness lying between 17 and 30 µm.

It is not possible to obtain a film with balanced characteristics in both directions using this flat biaxial orientation process.

Moreover, with the "flat" or "double bubble" processes as they now exist, it is not possible to vary at will mechanical characteristics, shrink forces and shrink percentages in each of the two directions.

In addition, it is not possible with these processes to obtain very thin monolayer films of linear low-density polyethylene having homogeneous thickness while retaining sufficient mechanical and shrink properties.

Consequently, one of the objects of this invention is to provide a process for preparing heat-shrinkable films by flat biaxial orientation allowing improved control of shrink forces and percentages, resistance to breaking and resistance to tearing.

Another object of this invention is to provide ultra-thin monolayer films, of uniform thickness, having excellent mechanical properties, an excellent optical-slip compromise, an enlarged heat-sealing range, as well as consequently, multi-layer films comprising such ultra-thin films as core layers.

The expression "uniform thickness" is taken to mean that, for a surface of 1 $m^2$, the thickness will not vary by more than 10%, preferably 6% by weighing methods.

The preparation process is characterized in that:
  heating takes place beyound melting temperature followed by extrusion of one or several ethylene copolymers and a $C_4$ to $C_{18}$ alpha-olefin comonomer with a density lying between 0.89 and 0.94, separately or possibly mixed with one or several olefinic polymers,
  the extruded film is poured and cooled at the appropriate hardening temperature,
  the film is stretched a first time in the machine direction at the appropriate temperature between 3 to 7 times the initial dimension of the non-stretched film,
  the film is stretched a second time in the transverse direction and at the appropriate temperature, between 3 to 15 times, preferably between 5 to 12 times, the initial dimension of the non-stretched film,
  the biaxially oriented film is stretched a third time in the machine direction at the appropriate temperature between 1.01 and 3 times the dimension after the first draw,
  the resultant biaxially oriented film is cooled at room temperature.

After the third draw, the expression "overdrawn" is also used to describe this film.

With respect to certain practical arrangements for carrying out the biaxial orientation process, the specialist may usefully refer to European Patent 319 401 relating to a process including a flat biaxial orientation stage.

The expression "linear low-density polyethylene" (abreviated LDPE) is taken to refer to polymers formed from the polymerization of ethylene with, in general, a quantity of 0.5 to 20%, preferably 1 to 10%, of an alpha-olefin containing 4 to 18 carbon atoms and in particular 4 to 8 carbon atoms. These polymers also contain very low-density polyethylene (VLDPE) or plastomers.

The linear low-density polyethylenes have a density lying between 0.915 and 0.94 g/$cm^3$. LDPE are preferred in the context of this invention.

Among the examples of alpha-olefin suitable in the context of this invention, particular mention may be made of 1-butene, 1-pentene, 1-hexene, 1 1-heptene 1-octene, 4-methylpentene-1, 1-decene, 1-undecene and 1-dodecene.

The copolymerization reaction of these comonomers may be carried out at low or medium pressure using a Ziegler-Natta catalyst or by the process of metallocene catalysis ("single site").

The density of the copolymer lies between 0.89 and 0.94, i.e. a density of 0.89 to 0.94 g/$cm^3$ measured at 25° C. according to ASTM.

The copolymer presents a fluidity index in the molten state lying between 0.2 and 3 g/10 min according to ASTM.

The process involving a flat biaxial orientation is preferred because of the difficulty in making ultra-thin films by a bubble process.

The applicants unexpectedly discovered that the process of fabrication was considerably improved by a third draw in the machine direction in that the mechanical characteristics could be better controlled and/or in that ultra-thin films could thus be obtained. For a same resulting draw ratio, it emerged that a draw sequence consisting of longitudinal draw—transverse draw—longitudinal draw is not equivalent to the standard sequence of two longitudinal and transverse phases.

The overdraw ratio depends on the temperature at which overdraw is carried out. The lower the temperature, the higher the ratio must be.

Generally speaking, it is possible to obtain a draw ratio as low as 1.01 in the region of melting temperature (up to 30° C. below melting temperature).

To balance the film, it is nonetheless desirable to perform an overdraw of at least 1.05, advantageously between 1.1 and 1.5.

According to an advantageous alternative, the third draw lies between 1.01 and 2.5 times the initial dimension after the first draw, preferably between about 1.05 and 2 times relative to the dimension obtained after the first draw.

During fabrication, the polymers are associated in a known manner with small quantities of slip agents and antiblock agents.

Among the antiblock agents, mention may be made of silica, and among the slip agents, of stearamide, erucamide or oleamide.

Typically, these additives will be present in a weight proportion not exceeding 10,000 ppm of the total mixture, generally between 1,000 and 5,000 ppm.

The expression "olefinic polymer capable of being associated with linear low-density polyethylene", is taken to refer to polymers which improve the properties of the resulting film (improved heat sealing, improved transparence, permeability, possibility of crosslinking, mechanical characteristics, etc.).

When the copolymer is in a mixture, it may advantageously be associated with a low-density radical-type polyethylene, well known to the specialist, or an ethylene/vinyl acetate (EVA) copolymer, or a high-density polyethylene or an ethylene/propylene copolymer.

In general, the proportion of associated polymer present in the mixture is not above 40% by weight relative to the total mixture.

Among the other characteristics making it possible to implement the preparation process according to the invention, mention may be made of the following.

The polymer or the polymer mixture is extruded at a temperature lying between 180° and 250° C.

The hardening temperature generally lies between 10° and 80° C.

The extruded film is then re-heated before being drawn in the machine direction at a temperature lying between 70° and 130° C.

After drawing in the machine direction, the film is heated to a temperature generally lying between 110° and 140° C., then drawn in the transverse direction at the previously mentioned draw ratio.

The film may be cooled at a machine-direction draw temperature lying between 40° and 70° C. and "overdrawn". In this case and given that the overdraw temperature may be high, as previously mentioned, there is no need to cool the film and perform overdraw directly. Care must be taken not to perform this third draw at a temperature which would result in too much of the preceding transverse orientation being lost. This third draw may also be performed at a later stage. The temperature of this third draw lies between 20° and 130° C.

The film is then cooled at room temperature and collected.

The unwinding speed generally lies between 20 and 200 m/min but speeds of up to 250 m/min have been obtained with this process.

The invention also relates to a heat-shrinkable ultra-thin monolayer film of homogeneous thickness, made of linear low-density polyethylene, obtainable by the process as previously described, characterized in that it presents in at least one direction, preferably in both directions, a shrink percentage at 120° C. (in %) in excess of 20%, preferably in excess of 30% in at least one direction, advantageously of 40%, and in that it presents a thickness lying between 5 and 11 μm.

Advantageously, this film presents a surface shrink of at least 75%, preferably 80–85%. Surface shrink percentage is taken to refer to the surface loss of a square after shrinkage.

In addition to reducing the total weight of packagings due to their thinness, thin films according to the invention shrink faster and as a result are better suited to the increased output rates of shrinking machines (heat sealing speed is also higher with these films).

These films have a shrink force which is quite equivalent to that of thin films of greater thickness. That is, a shrink force which is above 200 N/cm$^2$ at 106° C. in at least one direction.

The ultra-thin monolayer film also presents advantageously the following characteristics, either separately or in combination:

The film presents a resistance to the propagation of a 2 mm tear above or equal to 4N in at least one direction with an elongation at the 2 mm tear above or equal to 10% in at least one direction.

The film presents a tensile resistance of at least 6 DaN/mm$^2$ in at least one direction and a tensile elongation of above 75% in at least one direction.

The film presents a heat seal resistance above or equal to 0.8 N/μin a temperature range as wide as 177° C.–260° C.

In addition, according to a more advantageous alternative, the machine direction/transverse direction shrink percentage ratio at 120° C. is equal to or above 1, and advantageously the machine direction/transverse direction shrink force ratio is above or equal to 1 at 106° C.

In this case, the films according to the invention have an unbalanced shrink and are particularly suitable for applications requiring stronger shrink characteristics in one direction than in the other.

For example, in the case of conformation machines and, more particularly, of thick articles (dictionaries), a stronger shrink is required in the machine direction.

In the case of wrapping for elongated articles (thin French-style loaves of bread, curtain rods, skis), it is preferable to use a film having a shrink force which is stronger in the transverse direction.

Similarly, for the packaging of flat and non-rigid products in a single direction (magazines, note pads, etc.), it is interesting to use a film with a shrink force which is weaker in one direction than in the other.

According to another advantageous alternative, the film thickness lies between 6 and 10 μm.

The chemical compositions of the film are similar to those indicated with respect to the preparation process.

The invention also relates to a heat-shrinkable multi-layer film comprising a core layer and two external or intermediate layers applied on the sides of the core layer, characterized in that the core layer is made up of a heat-shrinkable thin film such as described above.

These multi-layer films are well known and are disclosed in particular in French Patent 2 521 907 or U.S. Pat. No. 4,194,039.

Generally, the multi-layer film will be formed by coextrusion of a triple-layer sandwich structure, notably according to the following proportions in weight:

first external layer: 5 to 35%, core layer: 30 to 90%, second external layer: 5 to 35%.

The intermediate or external layers are advantageously formed of either linear low-density polyethylene or of a propylene-ethylene copolymer, containing a small proportion of ethylene as described notably in U.S. Pat. No. 4,194,039, or a LDPE, or an EVA-type resin. All these layers may be formed of a mixture of the same family or of a different family.

The following examples are non limitative illustrations of the invention.

EXAMPLE 1

An ultra-thin film is fabricated using a formulation containing a mixture of polymer consisting of 60% linear low-density polyethylene containing 7.5% of 1-octene, fusion temperature of about 126° C., density 0.924, and fluidity index in the molten state equal to 1; 40% of radical-type low-density polyethylene, fusion temperature equal to 116° C., density equal to 0.927 and fluidity index equal to 0.27; 2,500 ppm of oleamide; 2,000 ppm of natural silica.

The polymer is heated to a temperature of 230° C. and extruded through a flat die with a width of 880 min.

The material is received on a pouring drum whose hardening temperature is maintained at 30° C. by means of internal cooling.

The formed film is then taken up by the heated rollers, submitted to pre-heating up to 88° C., and then streched in the machine direction by passing between small-diameter rollers whose speed ratio in relation to the pre-heating rollers determines the draw. In this particular case, the ratio is 5/1.

At this stage of the process, the longitudinally drawn film is thermally stabilized by means of rollers maintained at a temperature above 70° C.

On exiting the rollers, the film is guided by means of clips between two rails laid out in a same horizontal plane. The clips are driven continuously along the rails by chains forming a loop. The clips are in the spread-out position upstream where their jaws are closed on the edges of the film. The rails diverge gradually as they move downstream according to a geometry calculated to produce a transverse draw ratio of 11/1.

This draw takes place in a hot-air oven comprising several heating zones, each of which may be adjusted separately.

Other practical information concerning the implementation of this process is given in the previously mentioned European Patent 319 401.

The third draw, or overdraw, is performed as follows:

The film is once more drawn in the machine direction by passing between two rollers whose speed ratio is fixed. In this example, the ratio is 1/1. The temperature of these rollers is set at 40° C.

After overdrawing, the film is carried by other rollers over a distance which allows it to return to room temperature.

Cooling of the film may, if required, be accelerated by means of an air shower.

Finally, upon exiting this overdraw zone, the film is wound on a coil.

The characteristics of the process of this example, along with those of examples 2, 3 and 4, are listed in Table I hereafter.

The film obtained displays the characteristics given in Table II hereafter.

EXAMPLE 2

Another ultra-thin film was fabricated with the same formulation as that detailed in Example 1, except that certain modifications were made to the implementation conditions of the process. In particular, the overdraw ratio was increased to 1.7.

The characteristics of the film thus obtained are listed in Table II hereafter.

EXAMPLE 3

Another ultra-thin film was fabricated with the same formulation as that detailed in Example 1, except that certain modifications were made to the implementation conditions of the process (see Table I hereafter). In particular, the overdraw ratio was increased to 2.0. The characteristics of the film thus obtained are listed in Table II hereafter.

TABLE I

|  | Ex. 1 | Ex. 2 | Ex. 3 | Ex. 4 |
| --- | --- | --- | --- | --- |
| Extrusion temp. (°C.) | 230 | 230 | 230 | 230 |
| Hardening | 40 | 45 | 40 | 40 |
| Longitudinal direction (LD) draw ratio | 5 | 5 | 5 | 5 |
| Transverse direction (TD) draw ratio | 11 | 11 | 11 | 11 |
| LD overdraw | 1.1 | 1.7 | 2 | 1.8 |
| LD draw temp. (°C.) | 40 to 80 | 40 to 80 | 40 to 80 | 40 to 80 |
| TD draw temp. (°C.) | 100 to 120 | 100 to 120 | 100 to 120 | 100 to 120 |
| LD overdraw temp. (°C.) | 48 | 45 | 52 | 110 |

Comparative examples 1 and 2 (commercially available films)

The characteristics of two commercially available films, used for wrapping and displaying excellent features, were measured and listed under References 1 and 2.

The characteristics of the films obtained are given in Table II hereafter.

TABLE II

Film characteristics

| Characteristics | | Standard | Ref. 1 | Ref. 2 | Ex. 1 | Ex. 2 | Ex. 3 | Ex. 4 |
| --- | --- | --- | --- | --- | --- | --- | --- | --- |
| Thickness (μm) | | | 15.0 | 19.0 | 7.5 | 7.5 | 7.0 | 9.0 |
| Shrink (%) at 120° C. | LD | internal method | 48 | 60 | 45 | 60 | 66 | 67 |
| | TD | oil bath - Exc. 10 cm × 10 cm 30 sec. | 53 | 62 | 71 | 62 | 59 | 57 |
| Shrink force at 106° C. (kg/cm$^2$) | LD | | 27 | 21 | 4 | 28 | 39 | 43 |
| | TD | | 38 | 30 | 48 | 20 | 10 | 15 |
| Tear resistance to 2 mm tear | LD | NF 54108 | 9.5 | 12.5 | 5 | 3 | 5 | 10 |
| | (N) TD | | 8.6 | 12.1 | 10 | 4 | 2 | 6 |
| Elong. (%) to 2 mm tear | LD | | 6 | 15 | 13 | 13.5 | 10.4 | |
| | TD | | 7 | 16 | 4 | 17 | 14 | 10.6 |
| Haze | | ASTM 1003 | 2.8 | 3.1 | 2.5 | 1.9 | 2.6 | 1.2 |
| Gloss (α = 20°) | | ASTMD 523 | 120 | 115 | 118 | 120 | 118 | 125 |
| Friction coefficient static | | | 0.50 | 0.35 | 0.25 | 0.28 | 0.26 | 0.25 |
| dynamic | | | 0.35 | 0.18 | 0.17 | 0.18 | 0.16 | 0.18 |
| Tensile resistance (DaN/mm$^2$) | LD | ASTMD 882 | 13.4 | 8.9 | 7.2 | 10.1 | 11.9 | 15.3 |
| | TD | | 13.8 | 10 | 18.6 | 12.9 | 13.1 | 14.3 |
| Tensile elongation (%) | LD | | 100 | 133 | 193 | 124 | 82 | 67 |
| | TD | | 96 | 145 | 21 | 52 | 71 | 73 |
| Resist. to heat sealing | (N) | internal method T = 177° C. t = 1 sec | 9.3 | 21.3 | 7.8 | 7.9 | 7.8 | ... |
| | (N/μ) | p = 1.5 bars | 0.6 | 1.1 | 0.8 | 1.1 | 1.1 | ... |
| | (N) | T = 260° C. t = 0.25 sec | 20.6 | 6.9 | 7.7 | 9.4 | 9.6 | ... |
| | (N/μ) | P = 1.5 bars | 1.3 | 0.4 | 0.8 | 1.3 | 1.4 | ... |

EXAMPLE 4

Another ultra-thin film was fabricated with the same formulation as that detailed in Example 1, except that certain modifications were made to the implementation conditions of the process. In particular, the overdraw ratio was increased to 1.8 and the overdraw temperature to 110° C.

The characteristics of the film thus obtained are listed in Table II hereafter.

The chart presented hereinafter in the figure accompanying this description situates very clearly the examples in relation to the commercial products labeled References 1 and 2.

FIG. 1 is a diagram of the transverse direction—machine direction shrinks (in cm) at 120° C. for 10 cm×10 cm square surfaces (dimensions prior to shrinking) for the different films.

The slope line 1 represents the characteristics of a balanced film.

FIG. 2 represents the influence of the overdraw ratio on the shrink forces measured longitudinally and transversely at 106° C.

We claim:

1. Biaxially oriented heat-shrinkable ultra-thin monolayer film of homogeneous thickness, made of linear low-density polyethylene, made by a flat process in which:

at least one ethylene/alpha-olefin copolymer which comprises an alpha-olefin having 4 to 18 carbons and has a density between 0.89 and 0.94 g/cm$^3$ optionally mixed with one or more olefinic polymers is heated above the melt temperature and extruded, the extruded film is poured and cooled at a hardening temperature, the film is drawn a first time in the machine direction between 3 and 7 times the initial dimension of the non-stretched film, the film is drawn a second time in the transverse direction between 3 and 15 times the initial dimension of the non-stretched film, the biaxially oriented film is drawn a third time in the machine direction between 1.01 and 3 times the dimension after the first draw, and the biaxially oriented film obtained is cooled at room temperature, characterized in that the film has, in at least one direction, a shrink percentage at 120° C. above 20%, and in that the film has a thickness between 5 and 11 μm.

2. Heat-shrinkable ultra-thin monolayer film according to claim 1, characterized in that the thickness lies between 6 and 10 μm.

3. Heat-shrinkable ultra-thin monolayer film according to claim 2, characterized in that the machine direction/transverse direction shrink percentage ratio at 120° C. is above or equal to 1.

4. Heat-shrinkable ultra-thin monolayer film according to claim 3, characterized in that the shrink force ratio at 106° C. is above or equal to 1.

5. Heat-shrinkable ultra-thin monolayer film according to claim 4, characterized in that the linear low-density polyethylene is an ethylene/alpha-olefin copolymer which comprises less than 10% by weight of said alpha-olefin, and said copolymer has a density between 0.915 and 0.94 g/cm$^3$.

6. Heat-shrinkable ultra-thin monolayer film according to claim 5, characterized in that it comprises, by weight, a mixture of:

60 to 100% of linear low-density polyethylene, 0 to 40% of a polymer selected from the group consisting of low-density polyethylene, ethylene vinyl acetate copolymer and high-density polyethylene and an effective quantity of antiblock and antislip agents.

7. Heat-shrinkable ultra-thin monolayer film according to claim 1 characterized in that the third draw is between 1.05 and 2 times the dimension after the first draw.

* * * * *